United States Patent
Firl et al.

(10) Patent No.: US 12,506,232 B2
(45) Date of Patent: Dec. 23, 2025

(54) CONNECTION POLE FOR AN ACCUMULATOR AND ACCUMULATOR HOUSING

(71) Applicant: Clarios Germany GmbH & Co. KG, Hannover (DE)

(72) Inventors: Julian Firl, Langenhagen (DE); Anne-Laure Ledoux, Langenhagen (DE); Andreas Dudenbostel, Neustadt am Rubenberge (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 303 days.

(21) Appl. No.: 17/311,522

(22) PCT Filed: Dec. 6, 2019

(86) PCT No.: PCT/EP2019/083945
§ 371 (c)(1),
(2) Date: Jun. 7, 2021

(87) PCT Pub. No.: WO2020/115267
PCT Pub. Date: Jun. 11, 2020

(65) Prior Publication Data
US 2022/0021088 A1 Jan. 20, 2022

(30) Foreign Application Priority Data
Dec. 7, 2018 (DE) .................. 102018131385.3

(51) Int. Cl.
*H01M 50/567* (2021.01)
*H01M 10/06* (2006.01)
(Continued)

(52) U.S. Cl.
CPC ......... *H01M 50/567* (2021.01); *H01M 10/06* (2013.01); *H01M 50/16* (2021.01);
(Continued)

(58) Field of Classification Search
CPC .. H01M 50/561; H01M 50/567; H01M 10/06; H01M 50/16; H01M 50/172; H01M 50/543; H01M 50/552
See application file for complete search history.

(56) References Cited

U.S. PATENT DOCUMENTS

| 6,033,801 A * | 3/2000 | Casais ................. H01M 50/172 |
| | | 429/182 |
| 2002/0002772 A1* | 1/2002 | Hirano ................. H01M 50/564 |
| | | 29/874 |

(Continued)

FOREIGN PATENT DOCUMENTS

| CN | 1617820 A | 5/2005 |
| CN | 102859745 A | 1/2013 |

(Continued)

OTHER PUBLICATIONS

International Search Report of the International Searching Authority dated Jan. 27, 2020 for International Appln. No. PCT/EP2019/083945 filed Dec. 6, 2019, 5 pages.

(Continued)

Primary Examiner — Jessie Walls-Murray
(74) Attorney, Agent, or Firm — Boardman & Clark LLP

(57) ABSTRACT

Disclosed is a connection pole for a rechargeable battery. The connection pole has a connection region for securing a pole terminal to the connection pole, and a securing region for securing the connection pole to a housing part of the rechargeable battery. The connection region is in particular of circular or substantially circular form at least at its end facing the securing region, wherein a circumferential region is provided in an end region, which faces the connection region, of the securing region, which circumferential region at least substantially has a ring shape and, for the purpose of preventing rotation of the connection pole, has on its outer circumference a tooth system projecting radially from the (Continued)

Figure 1A:
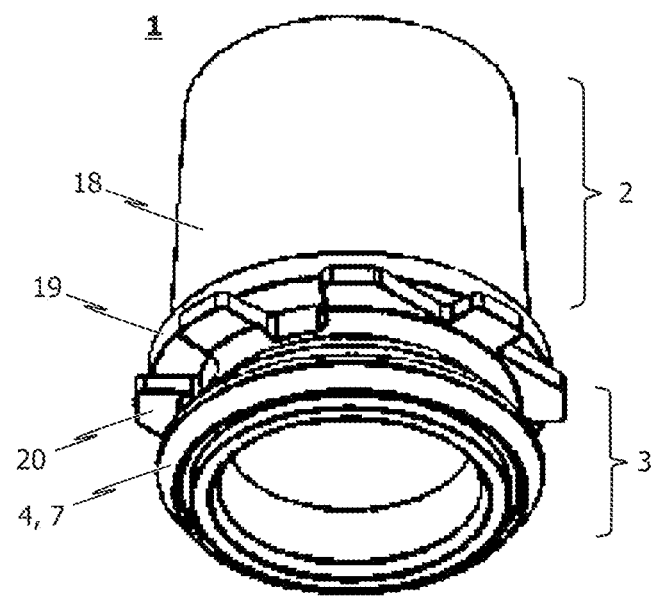

circumferential region. Here, the diameter of the substantially ring-shaped circumferential region is consistently smaller than the diameter of that end of the connection region which faces the securing region.

19 Claims, 4 Drawing Sheets

(51) Int. Cl.
H01M 50/16 (2021.01)
H01M 50/172 (2021.01)
H01M 50/543 (2021.01)
H01M 50/552 (2021.01)

(52) U.S. Cl.
CPC ....... H01M 50/172 (2021.01); H01M 50/543 (2021.01); H01M 50/561 (2021.01)

(56) References Cited

U.S. PATENT DOCUMENTS

| | | | | |
|---|---|---|---|---|
| 2007/0122696 A1* | 5/2007 | Richter | ............... | H01M 50/561 429/180 |
| 2008/0241677 A1* | 10/2008 | Garcia Alberola | . | H01M 50/172 429/181 |
| 2013/0052519 A1* | 2/2013 | Streuer | ............... | H01M 50/561 429/178 |
| 2015/0030904 A1* | 1/2015 | Ledoux | ............... | H01M 50/561 29/730 |
| 2016/0043377 A1* | 2/2016 | Heid | ................... | H01M 50/561 429/175 |
| 2018/0175363 A1* | 6/2018 | Heid | ................... | H01M 50/193 |
| 2018/0205050 A1* | 7/2018 | Yu | ....................... | H01M 50/561 |

FOREIGN PATENT DOCUMENTS

| | | | | |
|---|---|---|---|---|
| CN | 207530426 U | 6/2018 | | |
| DE | 102005046256 A1 | 4/2007 | | |
| DE | 102009016386 A1 | 10/2010 | | |
| EP | 1347522 A1 * | 9/2003 | ............. | H01M 2/06 |
| JP | 2010238552 A * | 10/2010 | ............. | Y02E 60/10 |
| JP | 5426214 B2 | 2/2017 | | |
| WO | 2011110317 A1 | 9/2011 | | |
| WO | 2017029328 A1 | 2/2017 | | |
| WO | 2017098960 A1 | 6/2017 | | |

OTHER PUBLICATIONS

Written Opinion of the International Searching Authority dated Jan. 27, 2020 for International Appln. No. PCT/EP2019/083945 filed Dec. 6, 2019, 5 pages.

* cited by examiner

CONNECTION POLE FOR AN ACCUMULATOR AND ACCUMULATOR HOUSING

CROSS-REFERENCE TO RELATED APPLICATIONS

This application is a national phase filing of International Patent Application No. PCT/EP2019/083945, entitled "CONNECTION POLE FOR AN ACCUMULATOR AND ACCUMULATOR HOUSING," which has an international filing date of Dec. 6, 2019, which claims priority to German Patent Application No. 102018131385.3 filed Dec. 7, 2018, the entire contents of each of which is hereby incorporated herein by reference for all purposes.

The present invention relates to a connection pole for a rechargeable battery and to a rechargeable-battery housing. The invention furthermore relates to a plastic battery cover for closing a battery housing, having a lower side, which faces into the battery housing in the state in which it is mounted on the battery housing, and an opposite upper side, and having at least one metal connection pole passed through the battery cover. Moreover, the invention relates to a lead-acid battery having a plastic housing divided into cells, a multiplicity of electrode plates in the cells of the plastic housing, and having electrolyte in the cells.

In the production of batteries, especially rechargeable batteries and, in this context, especially starter batteries, the formation of leadthroughs, e.g. for pole connections and cell connectors, that are leaktight and remain leaktight represents a particular problem. The leadthroughs must be inexpensive and simple to produce and must be able to withstand the electrolyte, which is highly susceptible to creep. For this purpose, lead bushings are generally pressed or molded as pole leadthroughs into the battery cover or into the cell walls.

Despite different thermal expansion coefficients of metal and plastic, firm seating must be ensured here. Further problems due to the presence of acid in and during battery production are added to this.

The previously used connection poles are generally embodied as lead bushings, which are cold-rolled, cast in molds or injection molded. The necessary safeguards against twisting or anchorages to counteract removal from the cover are provided by projections and labyrinths. At the same time, improved sealing by extension of the creep distances for the electrolyte is targeted by a larger or smaller number of labyrinth rings.

WO 2014/198650 A1 discloses a pole leadthrough of this kind in the form of a lead bushing with labyrinth rings, for example, wherein an anti-rotation safeguard is furthermore provided.

In practice, however, it has been found that, even with this pole bushing known from the prior art, it is not possible to prevent gaps in the μm range occurring to a locally limited extent between the pole bushing and the battery cover during the manufacture of the battery, into which gaps acid penetrates during battery manufacture and remains in these gaps despite the most intense efforts at cleaning. In the course of time, this causes known damage phenomena due to corrosion.

To this end, it is indispensable in the prior art to achieve an improvement in sealing by coating the outer surface of the connection pole, e.g. with silicate grease or bitumen. A lubricant seal, which simultaneously protects the lead bushings against corrosion, is thus created.

With such a type of seal, however, the firm seating of the lead bushings is diminished. Moreover, the processing of such lead bushings is complex, and the molds are contaminated. Defects, e.g. cracks, can arise in the surrounding material owing to detachment of parts of the coating.

Even the treatment of the connection pole surface by sandblasting or some other method of roughening has not led to any significant improvements hitherto.

On the basis of this problem scenario, it is the underlying object of the invention, starting from a connection pole of the kind known from the publication WO 2014/198650 A1, for example, to develop this pole in such a way that, as the connection pole is pressed or molded into the battery cover, no capillary gaps or gaps in the μm range, in which acid or electrolyte can collect or through which acid or electrolyte can pass, arise between the connection pole and the material of the battery cover, in order in this way to be able to protect the connection pole effectively from corrosion, even without using a lubricant seal.

It is another object of the present invention to indicate a corresponding plastic battery cover or a corresponding battery housing as well as a lead-acid battery.

Regarding the connection pole, the object on which the invention is based is achieved by the subject matter of independent patent claim 1. Advantageous developments in respect of the connection pole according to the invention are specified in dependent patent claims 1-19.

Accordingly, the invention relates, in particular, to a connection pole for a rechargeable battery, wherein the connection pole has a connection region for securing a pole terminal to the connection pole and a securing region for securing the connection pole to a housing part of the rechargeable battery.

The term "connection region" used herein shall be taken to mean that region of the connection pole which, in the installed state of the connection pole, i.e. when the connection pole has been pressed or molded into the battery cover or into the housing part of the rechargeable battery, is correspondingly exposed toward the outside in order to allow the attachment of a pole terminal.

In contrast, the term "securing region" should be taken to mean herein that region of the connection pole which, in the installed state of the connection pole, is pressed or molded into the material of the housing part of the rechargeable battery.

Like the connection pole known from the publication WO 2014/198650 A1, the connection pole according to the invention has a corresponding anti-rotation safeguard in its securing region. In the case of the connection pole according to the invention, however, the anti-rotation safeguard is not formed by a circumferential projection which is provided with a tooth system on its outer circumference.

Rather, in the case of the connection pole according to the invention, the anti-rotation safeguard is formed by a circumferential region in an end region, which faces the connection region, of the securing region, which circumferential region at least substantially has a ring shape and, for the purpose of preventing rotation of the connection pole, has on its outer circumference a tooth system projecting radially from the circumferential region, wherein the diameter of the substantially ring-shaped circumferential region is consistently smaller than the diameter of that end of the connection region which faces the securing region.

In contrast to the anti-rotation safeguard used in the case of the connection pole known from WO 2014/198650 A1, the connection pole according to the invention provides in particular that the anti-rotation safeguard is completely encapsulated with plastic material in order to thereby ensure a higher tilting moment (bending) when the connection pole is embedded in a rechargeable-battery housing part by means of injection molding technology.

In addition, the anti-rotation safeguard used in the case of the connection pole according to the invention is characterized in that it has, on an outer circumference of the at least substantially ring-shaped circumferential region, a tooth system projecting radially from the circumferential region. Here, the at least substantially ring-shaped, circumferential region is—with regard to the connection region of the connection pole and in particular with regard to that end of the connection region which faces the securing region of the connection pole—dimensioned in such a way that the diameter of the substantially ring-shaped circumferential region is consistently smaller than the diameter of that end of the connection region which faces the securing region.

In this way, it is possible for the tooth system, which serves as an anchoring, of the anti-rotation safeguard to extend both inward and outward, wherein, in particular, the outer circle diameter of the toothing belonging to the tooth system is greater, and the inner circle diameter is smaller, than in the region situated thereabove. This ensures optimized safeguarding against rotation.

As a result of the optimized safeguarding against rotation, the connection pole, and in particular the securing region of the connection pole, can—compared to known connection poles—be made shorter, which has a positive effect on the weight and the production costs of the connection pole.

For example, in the exemplary embodiment of the connection pole according to the invention described below with reference to the accompanying drawings, material savings of up to 20% compared to conventional connection poles are possible, specifically due to the shortened overall length of the securing region.

The connection pole according to the invention is distinguished furthermore by the fact that, in the installed state, i.e. when the connection pole has been pressed or molded into a corresponding pole leadthrough in the housing part of the rechargeable battery, no capillary gaps or other gaps in the μm range between the components of the connection pole and the housing part material remain or occur in which acid or electrolyte can collect or through which acid or electrolyte can escape, thus ensuring leakage-free sealing between the connection pole and the housing part of the rechargeable battery, even without further sealing means.

For this purpose, it is envisaged in the case of embodiments of the connection pole according to the invention that, in that end region of the securing region which faces the connection region, more specifically between the anti-rotation safeguard, i.e. between the circumferential region provided with the tooth system, and the connection region, a circumferential projection is provided, said projection being of at least substantially circular-ring-shaped design and serving as a sealing projection. Through the provision of such a circumferential sealing projection of at least substantially circular-ring-shaped design above the anti-rotation safeguard, i.e. in a region between the anti-rotation safeguard and the connection region of the connection pole, the aim, namely that of ensuring that no capillary gaps or other gaps in the μm range between the components of the connection pole and the housing part material remain or arise, is made feasible. More specifically, it has been found that the provision of a sealing projection of this kind effectively prevents the formation of capillary gaps or other gaps between the components of the connection pole and the material of the rechargeable-battery housing part.

According to embodiments of the connection pole according to the invention, it is envisaged that the sealing projection, which is provided between the anti-rotation safeguard and the connection region of the connection pole, has an outer lateral surface, in particular a circular-ring-shaped lateral surface, which is formed without a tooth system. By means of this measure, it is possible, in particular, to ensure that, in a state in which the connection pole according to the invention is secured to the housing part of the rechargeable battery, i.e. when the connection pole has been pressed or molded into the housing part in a corresponding pole leadthrough, the sealing projection is completely covered by the material, in particular plastics material, of the housing part. In particular, this also applies to an upper circular ring surface of the circular-ring-shaped sealing projection which faces the connection region of the connection pole.

By virtue of the fact that the upper circular ring surface of the circular-ring-shaped projection is also completely covered by the material, in particular plastics material, of the housing part when the connection pole has been pressed or molded into the housing part of the rechargeable battery, the formation of gap regions or capillary gaps in which electrolyte or acid remains or through which electrolyte can escape can be effectively prevented.

In a preferred implementation of the last-mentioned embodiment, it is envisaged that the upper circular ring surface of the sealing projection is situated in a plane which lies in or below the section plane between the connection region and the securing region, wherein—as already stated at the outset—the connection region defines that region of the connection pole which is exposed relative to the housing part in a state in which the connection pole is connected to the housing part of the rechargeable battery.

According to a first alternative of the connection pole according to the invention, it is envisaged that the sealing projection has a lower circular ring surface which faces away from the connection region of the connection pole and which lies in a plane that corresponds to the plane in which an upper circular ring surface of the circumferential region (anti-rotation safeguard) provided with the tooth system lies.

However, more effective sealing between the connection pole and the housing part of the rechargeable battery can under some circumstances be achieved if the lower circular ring surface of the sealing projection lies in a plane that extends parallel to and at a distance from the plane in which an upper circular ring surface of the circumferential region provided with the tooth system lies.

In this context, it has proven particularly effective if a circular-ring-shaped under-cut region is provided between the circumferential region (anti-rotation safeguard), which is provided with the tooth system, and the sealing projection.

According to embodiments of the connection pole according to the invention, the undercut region may have a length of 0.1 mm to 0.8 mm, preferably a length of 0.2 mm to 0.7 mm, and even more preferably a length of 0.3 mm to 0.5 mm, when viewed in the longitudinal direction of the connection pole.

In order to achieve even better sealing in relation to the electrolyte highly susceptible to creep, it is envisaged, according to embodiments of the connection pole according to the invention, that the sealing projection has a lateral surface which is preferably beveled in the direction of the circumferential region (anti-rotation safeguard) provided with the tooth system.

As regards the anti-rotation safeguard of the connection pole according to the invention, it is envisaged that the tooth system of the circumferential projection has toothing in which preferably regularly radially projecting regions are formed when viewed in the circumferential direction of the projection. In this respect, it is envisaged, according to aspects of the present invention, that the radially projecting regions of the toothing project in particular further than the sealing projection, when viewed in the radial direction of the connection pole.

There is a trough-shaped region of the toothing between each two adjacent radially projecting regions of the toothing of the anti-rotation safeguard, said trough-shaped region projecting less far than the projecting regions of the toothing when viewed in the radial direction of the connection pole. As regards these trough-shaped regions of the toothing, it is envisaged that the circular sealing projection preferably projects further than the respective trough regions of the toothing.

In particular, according to embodiments of the connection pole according to the invention, it is provided that at least one trough-shaped region of the toothing extends inward in the radial direction as far as the outer circumference of the circumferential region provided with the tooth system. In this way, the anchoring and anti-rotation safeguard of the connection pole brought about by the tooth system can be optimized.

According to embodiments of the connection pole according to the invention, said connection pole has a labyrinth region in its securing region, and preferably in an end region of the securing region which lies opposite the connection region, wherein the outer wall of the connection pole has at least one circumferential projection in this labyrinth region. In this case, it is expedient if the circumference of the outer wall of the connection pole increases in a direction away from the connection region in at least one region of the labyrinth region which is not provided with a circumferential projection.

It is thereby possible to achieve smaller outer circumferences of the connection pole close to the connection region, i.e. in the upper region of the labyrinth region, thereby making it possible to reduce the quantity of material required for the connection pole in this region.

With regard to the tooth system of the connection pole according to the invention, it is provided here that at least some of the radially projecting regions of the toothing of the anti-rotation safeguard extend further outward in the radial direction than the at least one circumferential projection of the labyrinth region. This has an additionally positive effect on the anti-rotation safeguard and anchoring of the connection pole.

Thus, those wall regions in which no circumferential projection is arranged, either completely or partially, are taken to be the circumference of the outer wall of the connection pole in a region of the labyrinth region that is not provided with a circumferential projection. Consequently, these are wall regions of the outer wall in which no transitions to circumferential projections are provided either.

With the last-mentioned embodiment of the invention, it is thus possible, starting from the lower end of the connection pole, for the outer circumference to be reduced toward the connection region. It is thus possible, for example, to envisage enlarging the outer wall of the connection pole conically in a direction away from the connection region in at least one region of the labyrinth region outside the at least one circumferential projection. The outer circumference of the connection pole is thereby enlarged in an approximately linear manner in a direction away from the connection region in the at least one region of the labyrinth region outside the at least one circumferential projection.

As mentioned, a material saving can advantageously be achieved in the upper region of the labyrinth region by means of this embodiment of the connection pole. At the same time, sufficient mechanical stability of the connection pole can furthermore be ensured. The saving of the material of the connection pole, which is produced from lead, for example, leads to a perceptible reduction in the weight of the connection pole and thus also of a rechargeable-battery housing provided with the connection pole. The saving of material is also advantageously associated with a saving of costs.

The outer wall of the connection pole advantageously extends conically or in the form of a hyperboloid of one sheet in at least one region, more specifically in a region in which the circumferential projection or circumferential projections are not arranged.

According to embodiments of the connection pole according to the invention, the at least one circumferential projection provided in the labyrinth region is also reduced in diameter. A further saving of material and weight is thereby obtained. It is also possible for a plurality of circumferential projections to be provided.

According to an advantageous development of the invention, it is envisaged that the circumference of the outer wall of the connection pole increases in a direction away from the connection region in the entire labyrinth region in the regions that are not provided with a circumferential projection. It is thereby possible to maximize the saving of material and hence the saving of weight.

According to an advantageous development of the invention, the labyrinth region has a shorter extent in the longitudinal direction of the connection pole than the securing section. This allows the provision of further elements in the securing section without compromising the labyrinth region.

The at least one circumferential projection of the labyrinth region can be implemented with different profiles. A ring-type shape may be mentioned as a basic shape for the circumferential projection. According to an advantageous development of the invention, the at least one circumferential projection has a hook-shaped profile. The hook-shaped region of the profile can follow on on the outside of a projection shaped in the manner of a ring in accordance with the abovementioned basic shape, for example. The hook-shaped profile supports the formation of a labyrinth between the material of the connection pole and the plastic of the surrounding housing in an effective manner. It is thereby possible to further improve the sealing effect of the labyrinth.

According to an advantageous development of the invention, the connection pole is internally hollow. The circumference of the inner wall of the connection pole increases in a direction away from the connection region in at least one first region of the labyrinth region. In an advantageous development of the invention, that region of the inner wall which increases in respect of its circumference can be designed to overlap with that region of the outer wall which increases in respect of its circumference. According to an advantageous development of the invention, the inner wall and the outer wall of the connection pole extend in parallel in the longitudinal direction thereof, at least in certain sections. It is thereby possible to achieve constant wall thicknesses in the longitudinal direction of the connection pole, at least in certain sections. Overall, the connection pole can thereby be optimized further in respect of material savings and weight. This development can be achieved, for example, if the angle formed by a conical region of the inner wall relative to the longitudinal axis of the connection pole is substantially equal to the angle of a conical section of the outer wall relative to the longitudinal axis of the connection pole.

According to an advantageous development of the invention, it is envisaged that the first region, in which the circumference of the inner wall increases, does not project in the longitudinal direction of the connection pole beyond the region in which the circumference of the outer wall increases. In particular, provision can be made for the first region, in which the circumference of the inner wall increases, to extend as far as the connection region.

According to an advantageous development of the invention, it is envisaged that the first region, in which the circumference of the inner wall increases, projects in the longitudinal direction of the connection pole beyond the region in which the circumference of the outer wall increases. This allows the provision of further specially shaped sections of the inner wall.

According to an advantageous development of the invention, it is envisaged that the connection pole is internally hollow, and the circumference of the inner wall of the connection pole increases in the direction of the labyrinth region in the connection region.

According to an advantageous development of the invention, it is envisaged that the circumference of the inner wall and/or of the outer wall increases in a monotonically linear or arcuate fashion. The increase in the circumference can thus take place with a linear contour, with the result that the inner wall and/or the outer wall extend conically, at least in certain sections. It is also advantageously possible to provide an arcuate contour, e.g. with a hyperboloid shape. It is also advantageously possible to provide combined conical and arcuate sections on the connection pole at the inner wall and/or the outer wall.

In particular, the connection pole can be of rotationally symmetrical design. In this case, the previous statements in respect of the circumference of the inner wall or of the outer wall relate to the respective diameters thereof.

According to an advantageous development of the invention, the inner wall of the connection pole is enlarged conically in a direction away from the connection region in at least one second region of the labyrinth region. In the second region, the inner wall forms a larger angle relative to the longitudinal axis of the connection pole than in the first region. Such a stepwise enlargement of the cone angle allows the provision of inner regions of the connection pole with a graduated centering effect during the assembly of a rechargeable battery. The inner, hollow region of the connection pole is provided for the purpose of receiving a connection pin, which extends through the connection pole into the interior of the connection section. The connection pin is connected to electrode plate sets in the interior of the rechargeable battery.

In the context of the production of a rechargeable battery, a housing bottom part is first of all provided with the electrode plate sets, on which connection pins are already mounted.

A cover of the rechargeable battery, in which connection poles are molded by injection molding, is then placed on the housing bottom part. In this case, simple and quick centering of the connection poles relative to the connection pins is the aim in order to allow quick and efficient production of the rechargeable battery. The conical inner sections simplify this centering.

Another advantage is that a lower mandrel for the internal sealing of the injection molding compound with respect to the environment can be positioned quickly in the second conical region during the production of the cover of the rechargeable battery.

According to an advantageous development of the invention, the second region is on that side of the first section which faces away from the connection region.

According to an advantageous development of the invention, the circumference of the inner wall of the connection pole changes discontinuously at that end of the connection pole which faces away from the connection region. Such a discontinuity causes an abrupt change in the inside diameter. It is thereby possible, for example, to implement a ring-shaped end section of the connection pole with an enlarged diameter relative to the first or the second region.

An advantageous rechargeable-battery housing or a part thereof has at least one connection pole of the type described above. The securing section of the at least one connection pole is advantageously embedded in a rechargeable-battery housing part by means of injection molding. The rechargeable-battery housing part can be the cover of the rechargeable battery, for example.

An exemplary embodiment of the connection pole according to the invention will be described in greater detail below with reference to the attached drawings.

Figure 1B:
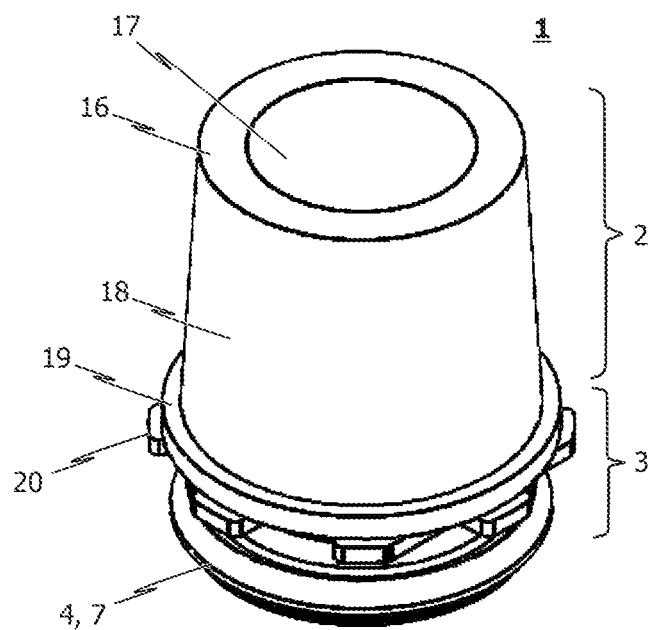
Figure 2:
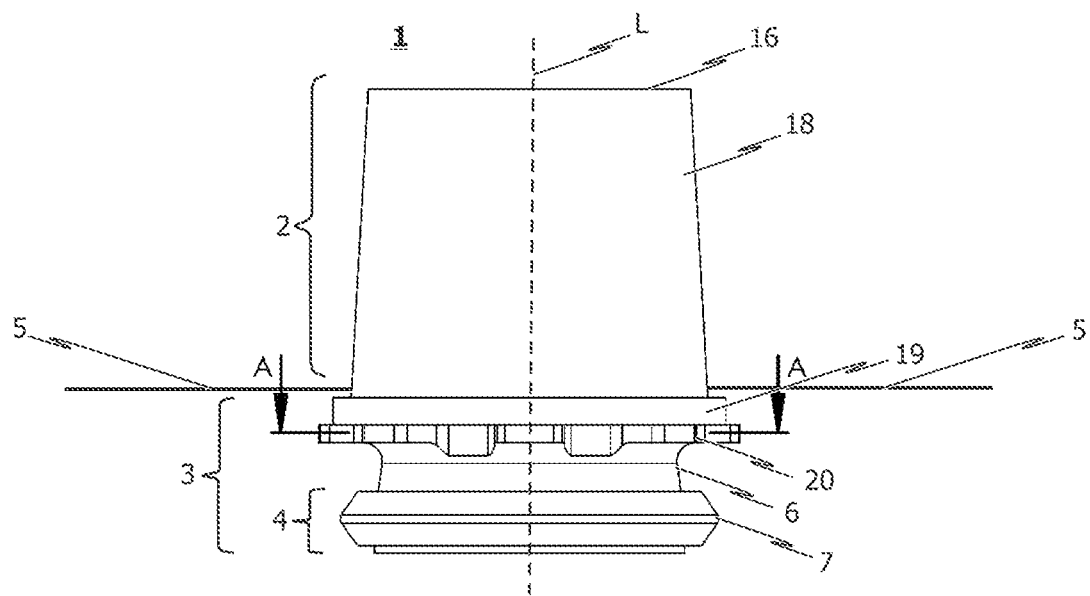
Figure 3:
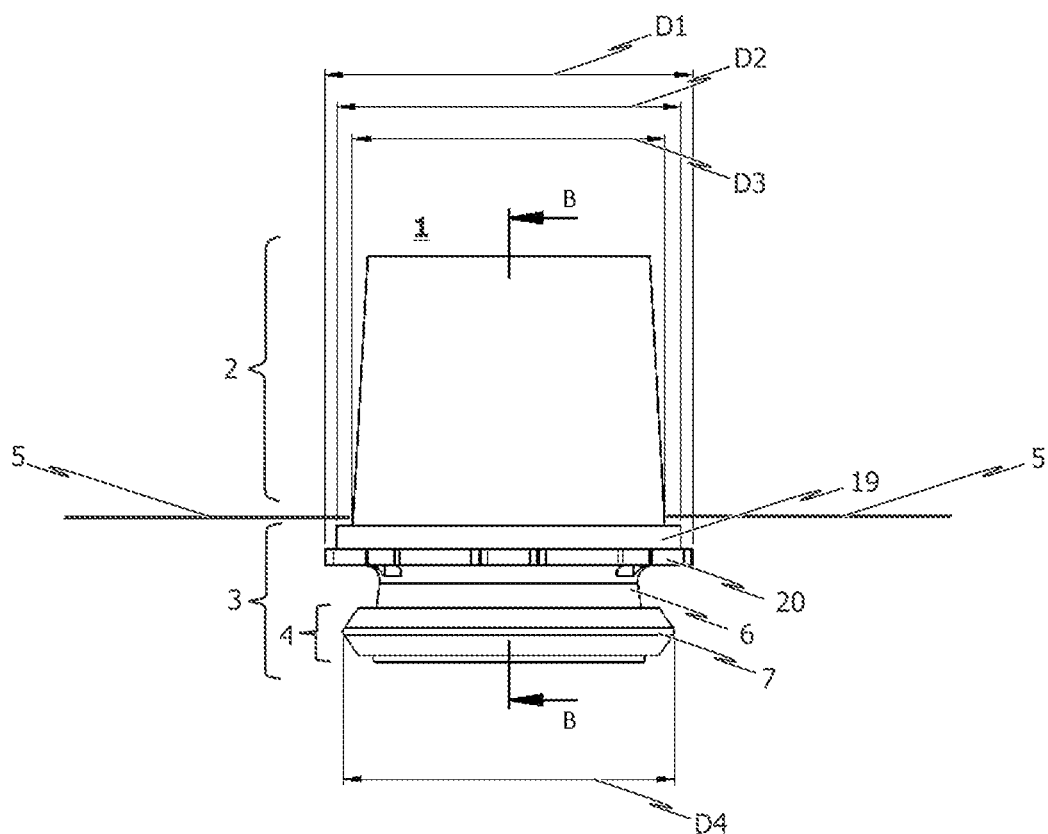
Figure 4:
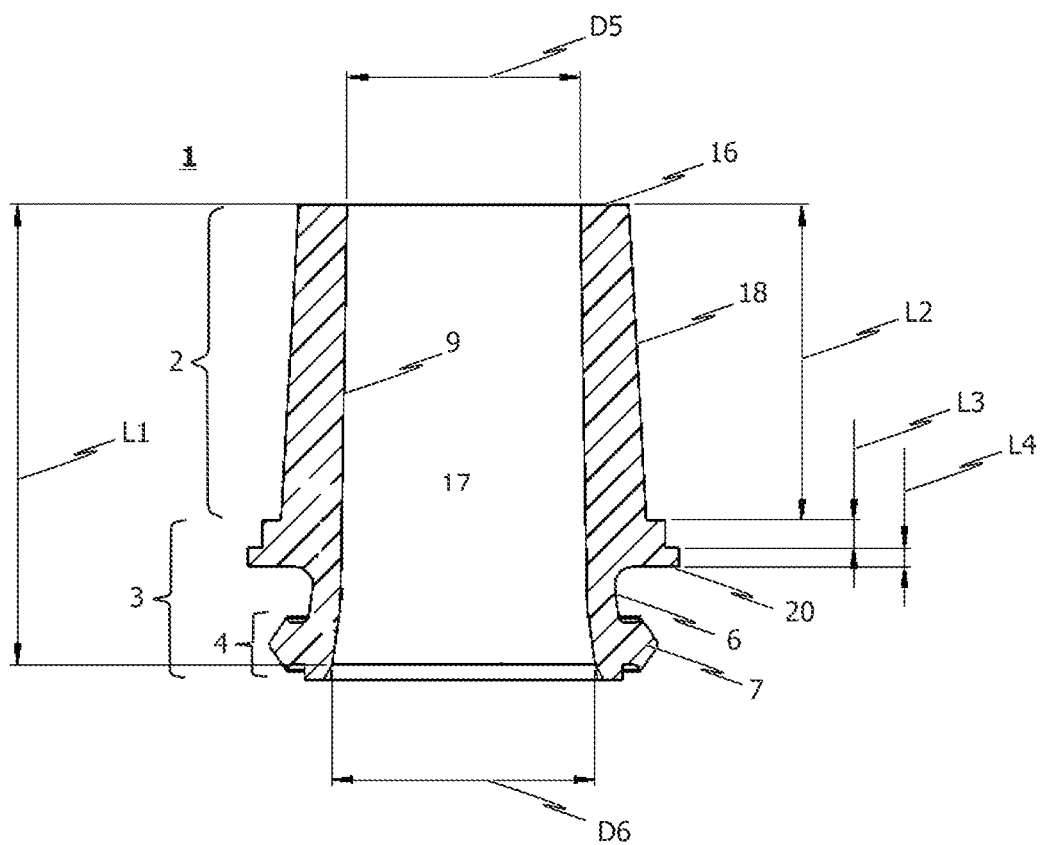
Figure 5:
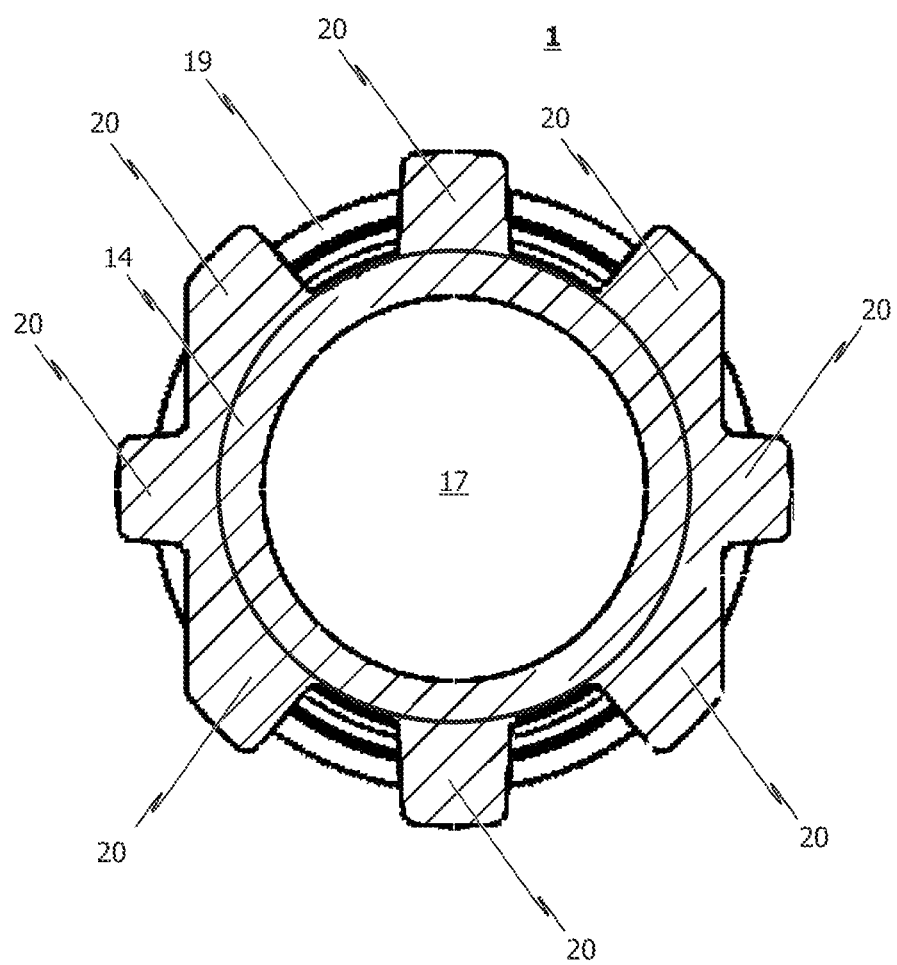

In the drawings:

FIGS. 1a, 1b each show isometric views of an exemplary embodiment of the connection pole according to the invention;

FIG. 2 schematically shows a first side view of the connection pole according to the exemplary embodiment;

FIG. 3 schematically shows a second side view of the connection pole according to the exemplary embodiment;

FIG. 4 schematically shows the connection pole according to the exemplary embodiment in a longitudinal sectional view along the line B-B in FIG. 3; and FIG. 5 schematically shows the connection pole according to the exemplary embodiment in a cross-sectional view along the line A-A in FIG. 2.

In the figures, the same reference signs are used for corresponding elements and components.

An exemplary embodiment of the connection pole 1 according to the invention will be described below with reference to the drawings. More specifically, FIG. 1a and FIG. 1b each show the exemplary embodiment of the connection pole 1 according to the invention in an isometric view, the connection pole being shown once again schematically in side view in each of FIG. 2 and FIG. 3 and schematically in a longitudinal sectional view in FIG. 4, specifically along the line B-B in FIG. 3.

FIG. 5 schematically shows the connection pole according to the exemplary embodiment in a cross-sectional view along the line A-A in FIG. 2.

The connection pole 1 according to the exemplary embodiment has a connection region 2 and a securing region 3. Moreover, a labyrinth region 4 is provided.

In the connection region 2, on its outside, the connection pole 1 has an outer wall 18 and an upper end surface 16. Arranged on the outside of the connection pole 1, in the securing region 3, adjoining the connection region 2, is a circumferential region 14, which can fundamentally have approximately a ring shape and serves as an anti-rotation safeguard. For this purpose, the circumferential region 14 has the tooth system 20 explained in greater detail below on the outer circumference.

Adjoining the circumferential region 14 (anti-rotation safeguard) is an outer wall 6 on the outside of the connection pole 1, said wall being arranged in the labyrinth region 4.

The outer wall 6 is interrupted by at least one (in the drawings: exactly one) circumferential projection 7 which has a hook-shaped profile. Apart from the tooth system 20, the connection pole 1 can be designed as a substantially rotationally symmetrical component, for example.

In the right-hand region of the connection pole 1 by way of example, FIG. 2 shows a segment of a rechargeable-battery housing part 5 molded onto the connection pole 1 by injection molding. As is apparent, the connection pole 1 is embedded in the material of the housing part 5 on its outside, in the securing region 3. The circumferential projection 7 of the labyrinth region 4 and the tooth system 20 of the circumferential region 14 form a labyrinth, which ensures good sealing of the interior of the rechargeable battery with respect to the environment.

The connection pole 1 is of hollow design. In a cavity 17 formed in the connection pole 1, an inner wall 9 extends, in certain sections, conically with different angles of the inner wall 9 relative to the longitudinal axis L of the connection pole 1.

In the case of the connection pole 1 according to the invention, the anti-rotation safeguard is formed by the circumferential region 14 in an end region, which faces the connection region 2, of the securing region 3. The circumferential region 14—as is shown in particular in the illustration in FIG. 5—at least substantially has a ring shape and, for the purpose of preventing rotation of the connection pole, is provided on its outer circumference with a tooth system 20 projecting radially from the circumferential region 14. The diameter of the substantially ring-shaped circumferential region 14 is consistently smaller than the diameter of that end of the connection region 2 which faces the securing region 3.

The connection pole 1 according to the invention provides in particular that the anti-rotation safeguard is completely encapsulated with plastic material in order to thereby ensure a higher tilting moment (bending) when the connection pole 1 is embedded in a rechargeable-battery housing part by means of injection molding technology.

In addition, the anti-rotation safeguard used in the case of the connection pole 1 according to the invention is characterized in that it has, on an outer circumference of the at least substantially ring-shaped circumferential region 14, a tooth system 20 projecting radially from the circumferential region 14. Here, the at least substantially ring-shaped, circumferential region 14 is—with regard to the connection region 2 of the connection pole 1 and in particular with regard to that end of the connection region 2 which faces the securing region 3 of the connection pole 1—dimensioned in such a way that the diameter of the substantially ring-shaped circumferential region 14 is consistently smaller than the diameter of that end of the connection region 2 which faces the securing region 3.

In this way, it is possible for the tooth system 20, which serves as an anchoring, of the anti-rotation safeguard to extend both inward and outward, wherein, in particular, the outer circle diameter of the toothing belonging to the tooth system 20 is greater, and the inner circle diameter is smaller, than in the region situated thereabove. This ensures optimized safeguarding against rotation.

As a result of the optimized safeguarding against rotation, the connection pole 1, and in particular the securing region 3 of the connection pole 1, can—compared to known connection poles—be made shorter, which has a positive effect on the weight and the production costs of the connection pole 1.

For example, in the exemplary embodiment of the connection pole 1 according to the invention described with reference to the accompanying drawings, material savings of up to 20% compared to conventional connection poles are possible, specifically due to the shortened overall length of the securing region 3.

The circumferential region 14 serving as an anti-rotation safeguard has an outer tooth system 20, which is formed by corresponding radially projecting regions (teeth). A trough-shaped region is situated between each two adjacent radially projecting regions (teeth) of the toothing. The toothing formed by the radially projecting regions and the trough-shaped regions provides an anti-rotation safeguard of the connection pole 1 in the plastics material of the rechargeable-battery housing part 5.

In the case of the exemplary embodiment of the connection pole according to the invention illustrated in the drawings, it is provided that a plurality of radially projecting regions (teeth) are arranged so as to be distributed over the circumference of the connection pole 1, wherein the projecting regions (teeth) can have different geometries (see FIG. 5).

In this context, it is advantageous if the radially projecting regions are at least partially provided with asymmetrical tooth flanks. As can be seen from the sectional view in FIG. 4, a first tooth flank of a radially projecting region has a smaller angle in relation to the outer circumference of the circumferential region 14 than the second tooth flank belonging to the radially projecting region. Tooth flanks formed with a smaller angle create the possibility of producing the connection pole 1 by means of a jaw-type mold. During demolding, however, the jaws can be readily separated from the connection pole 1 since no undercut is formed in the parting direction.

The exemplary embodiment of the connection pole 1 according to the invention which is illustrated in the drawings is distinguished inter alia by the fact that a circumferential sealing projection 19, which is at least substantially of circular-ring-shaped design, is provided between the circumferential region 14, which is provided with the tooth system 20 and serves as an anti-rotation safeguard, and the connection region 2 in that end region of the securing region 3 which faces the connection region 2 of the connection pole 1. This circumferential sealing projection 19 is used to effectively prevent the formation of any gaps between the connection pole 1 and the material of the housing part of the rechargeable battery in order in this way to allow acid to remain in the gaps and, in particular, also to allow highly effective leakage-free sealing.

As can be seen from the illustration in FIG. 2, the sealing projection 19 is arranged and embodied in such a way that it is covered, preferably over the entire area, by the material, in particular plastics material, of the housing part 5 in a state in which the connection pole 1 is secured to the housing part 5 of the rechargeable battery.

In this context, "covered over the entire area" means that, in particular, the upper circular ring surface, which faces the connection region 2 of the connection pole 1, of the sealing projection 19 is also covered by the material, in particular plastics material, of the housing part 5. To this extent, the upper circular ring surface of the circular-ring-shaped sealing projection 19 is situated in a plane which lies in or below the section plane between the connection region 2 and the securing region 3, wherein the connection region 2 defines that region of the connection pole 1 which is exposed relative to the housing part 5 in a state during which the connection pole 1 is connected to the housing part 5 of the rechargeable battery.

In the exemplary embodiments of the connection pole 1 according to the invention which are illustrated in the drawings, the circular-ring-shaped sealing projection has an outer lateral surface which is, in particular, circular-ring-shaped and which is preferably formed without a tooth system 20 since, in the illustrated exemplary embodiments of the connection pole 1 according to the invention, the sealing projection 19 has only the function of reliable sealing but not the function of safeguarding against rotation.

It can furthermore be seen from the drawings that the circumferential region 14 provided with the tooth system 20 (anti-rotation safeguard) has an upper circular ring surface which faces the circular-ring-shaped sealing projection 19 and which lies in a plane that extends parallel to the plane in which the upper circular ring surface of the circular-ring-shaped sealing projection 19 lies.

In the exemplary embodiment of the connection pole 1 according to the invention, the circular-ring-shaped sealing projection 19 has a lower circular ring surface which faces away from the connection region 2 of the connection pole 1 and which lies which is in a plane that corresponds to the plane in which the upper circular ring surface of the circumferential projection 14 provided with the tooth system 20 lies.

As an alternative to this, it is conceivable that the circular-ring-shaped sealing projection 19 has a lower circular ring surface which faces away from the connection region 2 of the connection pole 1 and which lies in a plane that extends parallel to and spaced apart from the plane in which the upper circular ring surface of the circumferential projection 14 provided with the tooth system 20 lies.

It is also conceivable that a circular-ring-shaped undercut region is provided between the sealing projection 19 and the region 14.

Leakage-free sealing can be achieved in an effective manner especially when the circular sealing projection 19 projects further than the respective trough-shaped regions of the toothing of the circumferential region 14 when viewed in the radial direction of the connection pole 1. In this case, however, it is not necessary for the circular-ring-shaped sealing projection 19 to also project further in the radial direction than the radially projecting regions of the toothing of the circumferential region 14.

Preferred dimensions of the diameters entered in FIG. 3 for the connection pole 1 shown there are given below:

| D1: 21.00-23.00 mm | D3: 18.40-20.40 mm |
|---|---|
| D2: 20.50-22.50 mm | D4: 19.70-21.70 mm |

Preferred dimensions of the diameters and lengths entered in FIG. 5 for the connection pole 1 shown there are given below:

| D5: 11.45-13.45 mm | L1: 23.60-25.60 mm | L3: 0.5-2.5 mm |
|---|---|---|
| D6: 13.05-15.05 mm | L2: 15.85-17.58 mm | L4: 0.4-2.4 mm |

The invention is not restricted to the exemplary embodiments shown in the drawings but can be obtained from a combination of all the features disclosed herein.

LIST OF REFERENCE SIGNS

1 Connection pole
2 Connection region
3 Securing region
4 Labyrinth region
5 Housing part of the rechargeable battery
6 Outer wall of the connection pole in the securing region
7 Circumferential projection (labyrinth region)
9 Inner wall of the connection pole
14 Circumferential region/anti-rotation safeguard
16 Upper connection surface
17 Cavity
18 Outer wall of the connection pole in the connection region
19 Sealing projection
20 Tooth system
L Longitudinal axis of the connection pole
L1 to L4 Length of indicated regions
D1 to D6 Diameter of indicated regions

The invention claimed is:

1. A connection pole for a rechargeable battery comprising:
a connection region and a securing region opposite the connection region, the connection region having, at least at an end of the connection region nearest the securing region, a circular shape and a first diameter;
a substantially ring-shaped circumferential region disposed along a portion of the securing region nearest the connection region, the substantially ring-shaped circumferential region having:
a tooth system projecting from an outer circumference of the substantially ring-shaped circumferential region, at least a portion of each tooth of the tooth system extending radially therefrom; and
a second diameter of the outer circumference of the substantially ring-shaped circumferential region being smaller than the first diameter; and
a circular circumferential sealing projection disposed within the securing region between the connection region and the substantially ring-shaped circumferential region, the circular circumferential sealing projection having a third diameter which is greater than the first diameter of the connection region, wherein the tooth system of the substantially ring-shaped circumferential region extends at least regionally radially past the circular circumferential sealing projection, and wherein the circular circumferential sealing projection has a first length which is greater than a second length of the tooth system, the first length being between 0.5 mm and 2.5 mm and the second length being between 0.4 mm and 2.4 mm.

2. The connection pole as claimed in claim 1, wherein the sealing projection includes an outer lateral surface which is formed without a tooth system.

3. The connection pole as claimed in claim 1, wherein, in an assembled state, at least a portion of an upper surface of the sealing projection is covered by material of a housing part of the rechargeable battery.

4. The connection pole as claimed in claim 3, wherein a section plane divides the connection region and the securing region and, in an assembled state, the connection region defines a region of the connection pole which is exposed relative to the housing part, wherein the upper surface of the sealing projection is situated in a first plane which lies in or below the section plane.

5. The connection pole as claimed in claim 4, wherein an upper surface of the substantially ring-shaped circumferential region lies in a second plane that extends parallel to the first plane.

6. The connection pole as claimed in claim 5, wherein a lower surface of the sealing projection lies in the second plane.

7. The connection pole as claimed in claim 5, wherein a lower surface of the sealing projection lies in a plane that extends parallel to and spaced apart from the second plane.

8. The connection pole as claimed in claim 1, wherein the sealing projection directly adjoins the substantially ring-shaped circumferential region.

9. The connection pole as claimed in claim 1, wherein the tooth system comprises toothing defined at least in part by regularly radially projecting regions formed along the circumferential direction of the substantially ring-shaped circumferential region.

10. The connection pole as claimed in claim 9, wherein the radially projecting regions of the toothing project at least as far as the sealing projection, when viewed in the radial direction of the connection pole.

11. The connection pole as claimed in claim 9, further comprising a trough-shaped region disposed between adjacent radially projection regions of the toothing which, when viewed in the radial direction of the connection pole, extends as far as the circumference of the substantially ring-shaped circumferential region.

12. The connection pole as claimed in claim 9, wherein the radially projecting regions of the toothing are at least partially provided with asymmetrical tooth flanks, wherein a first tooth flank of a radially projecting region has a smaller angle with respect to the outer circumference of the circumferential region than a second tooth flank belonging to the radially projecting region.

13. The connection pole as claimed in claim 1, further comprising a labyrinth region disposed along the securing region of the connection pole nearest a distal end of the securing region, wherein an outer wall of the connection pole includes at least one circumferential projection in the labyrinth region, and wherein the tooth system projecting radially from the substantially ring-shaped circumferential region projects further when viewed in the radial direction than the at least one circumferential projection of the labyrinth region.

14. The connection pole as claimed in claim 13, wherein a circumference of the outer wall of the connection pole increases in a direction towards the distal end of the securing region in at least one region of the labyrinth region which is not provided with a circumferential projection.

15. The connection pole as claimed in claim 13, wherein the at least one circumferential projection of the labyrinth region has a hook-shaped profile.

16. The connection pole as claimed in claim 13, wherein the connection pole is internally hollow, and a circumference of an inner wall of the connection pole increases in a direction towards the distal end of the securing region in at least one first section of the labyrinth region.

17. The connection pole as claimed in claim 1, wherein the connection pole is internally hollow, wherein the connection region is of frustoconical form, and wherein an outer diameter of the connection region decreases continuously from the end of the connection region nearest the securing region to a distal end of the connection region.

18. A rechargeable-battery housing or part thereof, comprising at least one connection pole as claimed in claim 1, wherein the at least one connection pole is embedded in the securing region thereof in a rechargeable-battery housing part by means of injection molding technology.

19. A rechargeable battery comprising a rechargeable-battery housing or part thereof as claimed in claim 18.

* * * * *